Inventor
Joseph Becker

UNITED STATES PATENT OFFICE.

JOSEPH BECKER, OF WASHINGTON, DISTRICT OF COLUMBIA.

FINDER.

1,210,135.  Specification of Letters Patent.  Patented Dec. 26, 1916.

Original application filed July 8, 1901, Serial No. 67,469. Renewed January 12, 1916, Serial No. 71,809. Divided and this application filed July 20, 1916. Serial No. 110,310.

*To all whom it may concern:*

Be it known that I, JOSEPH BECKER, a citizen of the United States, residing at Washington, in the District of Columbia, have invented new and useful Improvements in Finders, of which the following is a specification.

The present application, identified for convenience of reference as Case AL, is a division of my prior application Case F, now Patent 1,195,947, issued Aug. 22, 1916.

The present specification hereinafter makes specific reference to my other related applications as follows: Case A, now Patent 1,178,474, issued April 4, 1916; Case B, now Patent 1,178,475, issued April 4, 1916; Case C, now Patent 1,178,476, issued April 4, 1916; Case D, now Patent 1,190,623, issued July 11, 1916; Case F, specified in the immediately preceding paragraph as the parent application of the present division Case AL; Case J, Serial No. 246,169, filed February 17, 1905; Case W, now Patent 1,195,948, issued Aug. 22, 1916; Case Ah, Serial No. 87,977, filed March 31, 1916, as a division of my said Case C.

My present invention relates to camera finders of the type comprising a finder lens that forms a small size image of the camera field, and the invention consists in so constructing the said finder lens that it shall itself comprise a removable lens element which is adapted to be removed, at will, to permit of seeing the central part of the finder field on an enlarged scale; such novel result being useful and desirable whenever the object being photographed, or details in such object, are too small to be easily distinguished in the normal finder image that is produced when the said removable lens element is in operative position.

Figure 3:
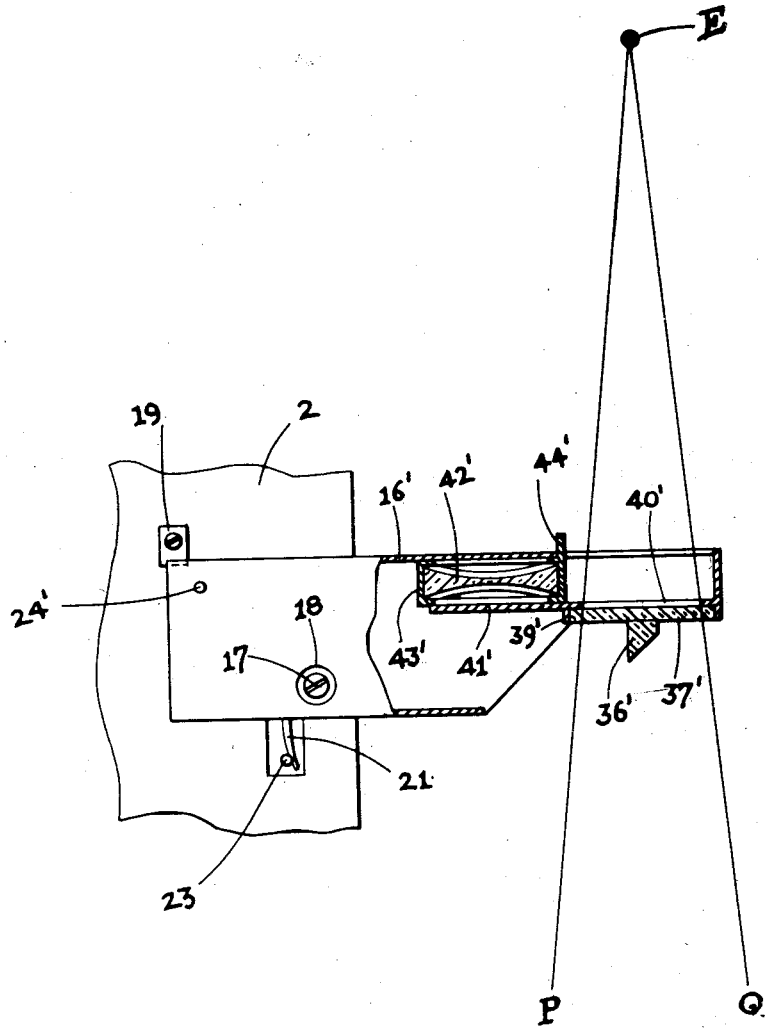

A finder comprising a removable lens element whose removal has the same effect of "increasing the scale of the finder image" is already shown in Figure 11 of my said case C; also in Fig. 3 of my said Case Ah; and again in my said Case J; but the removable lens element of these three other applications is an eccentric lens and is adapted to coöperate with a corresponding removable lens element of the camera objective; whereas, the present removable lens element is centric and is useful even when the camera objective does not contain any removable lens element.

My present invention is specially useful where the finder is a combined focus and field finder such as shown in my said Cases B, C, D and F; but the accompanying drawings show it only as applied, in two different forms, to the specific form of focus and field finder seen in my said Case F.

Figure 1:
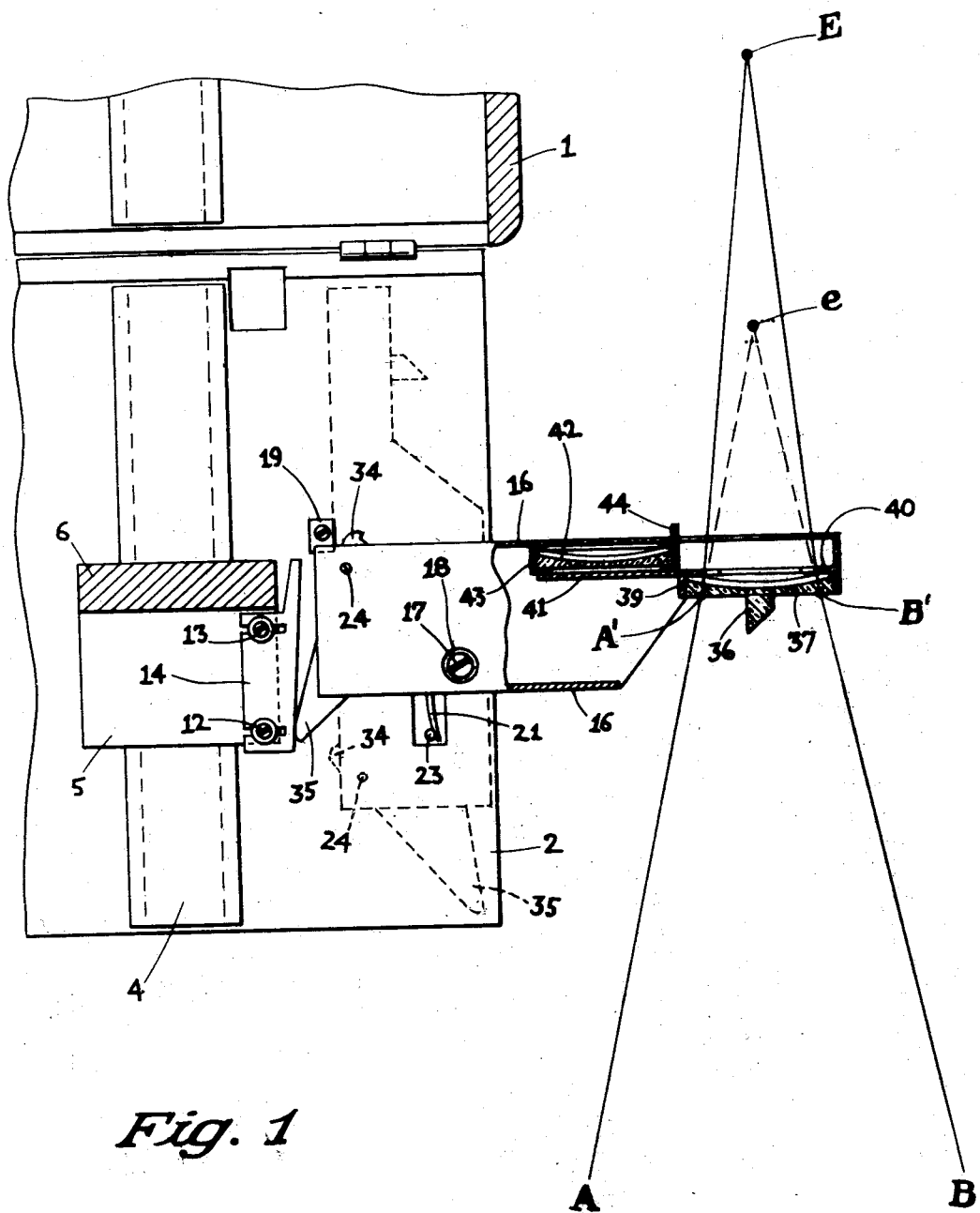
Figure 2:
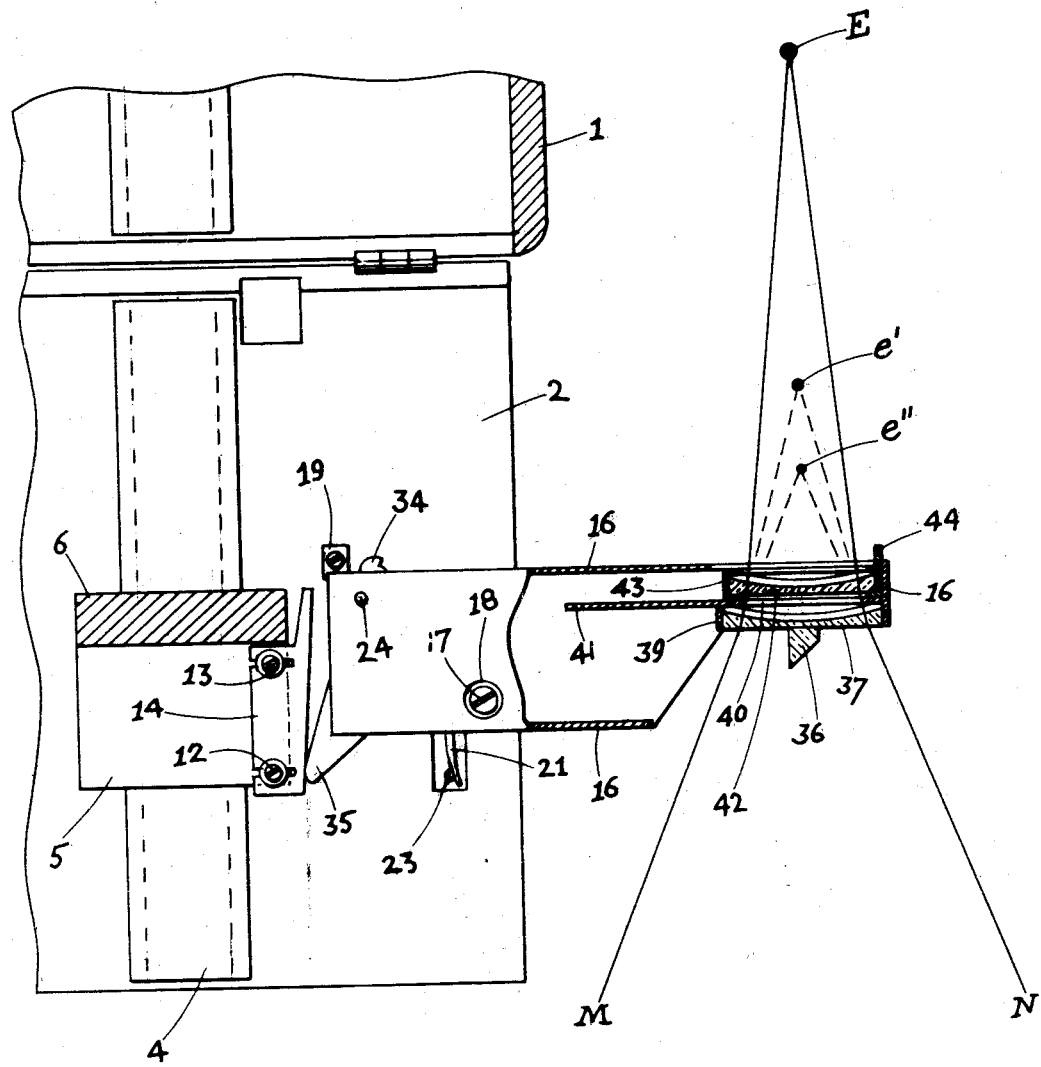
Figure 4:
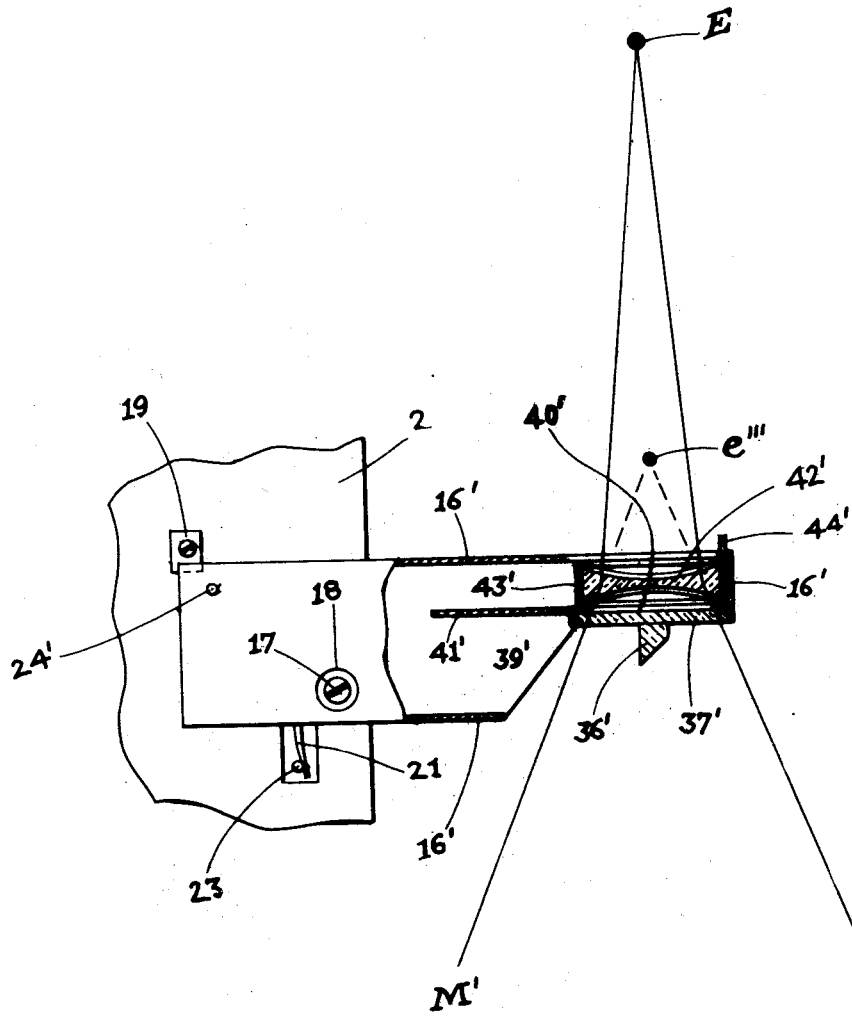

Fig. 1 is a horizontal section similar to Fig. 2 of my said Case F, but showing the removable lens element in removed position or position of non-use, and as having a focal length that is equal to that of the immovable lens element. Fig. 2 is a similar view of the same camera but showing the removable lens element in position of use to coöperate with the immovable lens element as a compound finder lens having an angular field $Me''N$ substantially equal to that of the camera objective. Figs. 3 and 4 are views corresponding, respectively, to Figs. 1 and 2, but showing a modified form of finder whose immovable lens element has a focal length that is infinitely long.

The camera comprises a box 1 with hinged cover 2, which is shown held open in horizontal position to serve as camera bed. Parts 4, 5, 6, 12, 13, 14, 16, 17, 18, 19, 21, 23, 24, 34 and 35 are all fully described in my said Case F, and it need only be recalled that the part 34, 35, pivoted at 24, carries the pivoted mirror of the "focuser."

The fixed mirror of the focuser is in the shape of a reflecting prism 36, cemented at the middle of a divergent lens 37, which is firmly held by clamp fingers (seen at 38 in Fig. 1 of my said Case F) in a chamber formed by sheet metal partitions 39 and 40, which are fixed within the box-like frame 16. The bottom 40 of this chamber is perforated with an opening corresponding to the camera plate and as the camera shown is square, with reversible back to take plates either way, the said opening has the outline formed by superposing crossed plates. Partition 40 is continued to the left, as at 41, to form a slideway for a second divergent lens 42, which is mounted in a rectangular framing or carriage 43, and this carriage 43 is adapted to fit the slideway nicely so it will remain therein wherever it may have been set by acting, with a finger, on the projecting lug 44. When lens 42 is in the position shown in Fig. 1, lens 37 is alone in use, and the finder field, for the eye at E, has the relatively small angular value AeB; but, when lens 42 is shoved to the right as shown in Fig. 2, the two lenses operate together as one lens of about twice the strength of lens 37, and the finder field, for the same eye at E, then has the angular value Me″N, which is the same as that of the camera field. The reason for not using this one strong lens in all cases, even in a plain field finder without focusing mirror, is that very often it is more desirable to see details of the finder image as in portraiture, when the operator wishes to wait for the expression, and in this case the central part of the field is usually alone important. The main object being centered on the plate, what the limits of the field may be is generally quite secondary. With the double lens the operator can see what the limits are, then, when about to expose, he uses the single lens for focusing and for centering.

The focal lengths of lenses 37 and 42, shown equal in Figs. 1 and 2, may have any other desired relative value, provided only the two lenses acting together have the proper resultant focal strength to show a correct field. Thus in Figs. 3 and 4 the nonmovable lens is a piece of plate glass 37′, whose focal length is infinitely long. The movable lens 42′ must accordingly be of sufficiently short focal length to show a finder field having an angular value M′e‴N′, Fig. 4, equal to Me″ N of Fig. 2, and to the camera field.

In Fig. 1 the extreme finder rays are AA′E and BB′E; and the incidental parts AA′, BB′ of these extreme rays, produced, meet in e, which is the virtual image as well as the virtual position of the observer's eye E. In Fig. 2 the extreme finder rays proceeding from M and N first converge in e″; then, after having traversed lens 37, they converge in e′; finally, after traversing the lens 42, they converge in the observer's eye at E. Points e′ and e″, Fig. 2, are therefore the successive virtual images as well as the successive virtual positions of the observer's eye E. In Fig. 3 the plate glass 37′ being a lens of infinite focal length forms the image of E in very nearly the same point E; and in Fig. 4 the conjugate of E is at e‴. The conjugate points e in Fig. 1, e″ in Fig. 2, and e‴ in Fig. 4 are not purely theoretical points, for they represent the images of eye E as they would be seen by a person standing in the camera field.

Note 1.—Fig. 1 of the present Case AL is based on Fig. 2 of my said Case F as such Fig. 2 appeared when originally filed. See the three approximately half size blue prints made July 17, 1901, and on file, of record in said Case F, since August 25, 1902. The present Fig. 2 of my said Case F is the result of amendments noted page 4 of the paper dated February 15, 1910 in the Patent Office record of such Case F.

Note 2.—Fig. 3 of the present Case AL is substantially identical with the original and now canceled Fig. 3 of my said Case F.

Note 3.—Claims 1, 2 and 3 made below are an exact copy of the claims presented August 28, 1902, in my said parent application, Case F, as claims 12, 13, and 14, respectively; and claims 4 and 5 are the same as claims 1 and 2 but limited to a removable lens that is centric.

Note 4.—Where the camera objective is compound and separable to determine two different focal lengths for the camera, the finder lenses should preferably be proportioned to correspond in accordance with the principles explained in Fig. 11 of my said Case C, or Fig. 3 of my said Case Ah, and in my said Case J.

Note 5.—The mirrors of my focuser, as explained in my said Case C, page 3, lines 74 to 80, also in my said Case A, page 19, lines 15 to 25, "are used to sight and determine what shall be the central point of the picture" and to this extent they alone constitute a camera finder. My present invention therefore determines a type of finder that is intermediate between the purely centering finder and the complete field finder.

Note 6.—The removable eccentric lens seen in Fig. 11 of my said Case C (or Fig. 3 of my said Case Ah) cannot be removed without enlarging the scale of the finder image, but such enlargement in scale is purely accidental as the prime object, in my said Case C, is to secure a change in the extent of the finder field, and this change is also accompanied by a change in the height of the observer's eye. If the lens l′, in Fig. 11 of my said Case C, were removable for the sole purpose of producing a change in the scale of the finder image, the single lens long focus finder l would have to be used in combination with the compound lens short focus camera-objective 81, 82, and this is not practicable because the central finder ray would drop so as to proceed into the camera box instead of over it. In applying my present invention, therefore, to the camera of my said Case C, the finder must be designed so that the removable finder element l′ shall be centric or at least not sufficiently eccentric to be inoperative for the purpose set forth in the present application Case AL.

What I claim as my invention and desire to secure by Letters Patent is:

1. A photographic finder comprising a minus lens of finite focus adapted to be removed out of the path of the rays that pass through the finder, in order to change the scale of the finder image, or ratio of a linear dimension in the finder image to the same dimension in the object.

2. A photographic finder comprising a finite focus lens adapted to be removed to change the scale of the finder image, or ratio of a linear dimension in the finder image to the same dimension in the original object.

3. The combination with a photographic finder of means for changing the scale of the finder image, that is the ratio of a linear dimension in the finder image to the same dimension in the original object, substantially as and for the purpose set forth.

4. A photographic finder comprising a centric minus lens of finite focus adapted to be removed out of the path of the rays that pass through the finder, in order to change the scale of the finder image, or ratio of a linear dimension in the finder image to the same dimension in the object.

5. A photographic finder comprising a centric finite focus lens adapted to be removed to change the scale of the finder image, or ratio of a linear dimension in the finder image to the same dimension in the original object.

In testimony whereof, I have signed my name to this specification.

JOSEPH BECKER.